(12) United States Patent
Eschmann et al.

(10) Patent No.: US 8,992,823 B2
(45) Date of Patent: Mar. 31, 2015

(54) METHOD OF OPERATING REGENERATIVE HEATERS IN BLAST FURNACE PLANT

(75) Inventors: Friedrich Eschmann, Bischofsheim (DE); Ralf Allmannsdörfer, Mainz-Kastel (DE); Johannes Münzer, Bad Schwalbach (DE); Sylvia Heilhecker, Nauheim (DE); Jean-Paul Simoes, Walferdange (LU)

(73) Assignees: Paul Wurth S.A., Luxembourg (LU); Paul Wurth Refractory & Engineering GmbH (DE)

( * ) Notice: Subject to any disclaimer, the term of this patent is extended or adjusted under 35 U.S.C. 154(b) by 0 days.

(21) Appl. No.: 14/352,744

(22) PCT Filed: Aug. 13, 2012

(86) PCT No.: PCT/EP2012/065830
§ 371 (c)(1),
(2), (4) Date: Apr. 18, 2014

(87) PCT Pub. No.: WO2013/056870
PCT Pub. Date: Apr. 25, 2013

(65) Prior Publication Data
US 2014/0252696 A1    Sep. 11, 2014

(30) Foreign Application Priority Data
Oct. 19, 2011   (EP) ...................................... 11185842

(51) Int. Cl.
*C21B 9/14*      (2006.01)
*C21B 5/06*      (2006.01)

(52) U.S. Cl.
CPC ... *C21B 9/14* (2013.01); *C21B 5/06* (2013.01); *C21B 2100/02* (2013.01); *C21B 2100/04* (2013.01); *C21B 2100/06* (2013.01)
USPC .............................................. 266/47; 266/197

(58) Field of Classification Search
CPC .................................... C21B 9/14; C21B 5/06
USPC ............................................. 266/197, 265, 47
See application file for complete search history.

(56) References Cited

FOREIGN PATENT DOCUMENTS

GB           378259      *   8/1932
GB           940653         10/1963

(Continued)

OTHER PUBLICATIONS

Jinscheng Sun, "Variable Cycle Control Strategy for Blast Furnace Stoves based on Blast Temperature Prediction", Computing, Communication, Control and Management, 2008, Aug. 3, 2008, pp. 39-43, XP031314124.
International Search Report for corresponding application PCT/EP2012/065830 filed Aug. 13, 2012; Mail date Sep. 19, 2012.

(Continued)

*Primary Examiner* — Scott Kastler
(74) *Attorney, Agent, or Firm* — Cantor Colburn LLP

(57) ABSTRACT

In a blast furnace plant, at least three regenerative heaters are cyclically operated on blast and on gas: while a regenerative heater is operated on gas, hot flue gas is produced and caused to flow through the regenerative heater so as to heat the heat storage elements; and while a regenerative heater is operated on blast, process gas, i.e. a CO-rich fraction of the top gas, is blown through the regenerative heater so that the process gas takes up heat from the heat storage elements, such that during a changeover of a regenerative heater from on-blast to on-gas operation, the regenerative heater is purged from process gas using flue gas collected after having flown through at least one of the regenerative heaters.

11 Claims, 1 Drawing Sheet

(56) References Cited

FOREIGN PATENT DOCUMENTS

| | | |
|---|---|---|
| WO | 2010106387 A1 | 9/2010 |
| WO | 2010133476 | 11/2010 |

OTHER PUBLICATIONS

Written Opinion for corresponding application PCT/EP2012/065830 filed Aug. 13, 2012; Mail date Sep. 19, 2012.

\* cited by examiner

METHOD OF OPERATING REGENERATIVE HEATERS IN BLAST FURNACE PLANT

TECHNICAL FIELD

The present invention generally relates to a method of operating regenerative heaters, especially hot-blast stoves, of a blast furnace plant.

BACKGROUND ART

It is well known to operate a blast furnace with a blast of ambient air heated by one of a set of regenerative heaters, typically three hot-blast stoves (often called "Cowpers"). Each hot-blast stove is cyclically operating by switching between a heating phase ("on gas" or "off-blast" phase) and a blowing phase ("on-blast" phase). To this effect, a hot-blast stove has internal heat storage elements, typically checker bricks, and an associated burner for producing hot flue gas to heat the checker bricks. The burner may be internal or external. To permit hot gas to pass during the heating phases, the hot-blast stove has a heating gas inlet and a flue gas outlet. They permit heating gas to flow from the burner through the stove and its heat storage elements (checker bricks) and, through the flue gas outlet, to a flue gas stack or chimney. With an internal burner, the heating gas is produced by combustion inside the stove. For the heating of high-pressure blast air, a conventional hot-blast stove further has a cold blast inlet connected to a cold blast main and a hot blast outlet connected to a hot blast main of the blast furnace. During the blowing phases, air is blown from the cold blast inlet, through the regenerative heater where it is heated up by the heat storage elements and then fed to the blast furnace via the hot blast outlet. Regenerative heaters are used to heat the blast to a temperature in the range of 1100° C. to about 1250° C.

In recent years, the re-use of top gas in the blast received increasing attention, since it enables notable reductions of $CO_2$ emissions. Corresponding installations recover blast furnace top gas and subject it, usually after conventional top gas cleaning, to a recycling process before injecting it back into the blast furnace. The recycling process includes $CO_2$ separation for withdrawing $CO_2$ from the process. To this effect, a gas separation unit separates top gas into tail gas that is rich in $CO_2$ (carbon dioxide) and into high calorific value process gas, rich in CO (carbon monoxide). As suitable gas separation unit it has been suggested to use a pressure swing adsorption (PSA) or a vacuum pressure swing adsorption (VPSA) unit or, alternatively, a $CO_2$ scrubber unit. The tail gas may be fed through a cryogenic unit to separate out pure $CO_2$ or subjected to any other further processing, ideally resulting in $CO_2$ capture and storage. The other gas stream, however, i.e. CO-enriched process gas, is fed back into the blast furnace as reducing gas, whereby altogether lower $CO_2$ production is achieved.

The required heating of CO rich process gas may be carried out in regenerative heaters. However, the replacement of an ambient air as cold blast with CO rich process gas, i.e. a reducing gas, has considerable implications. In particular, special measures and precautions are necessary concerning the changeover sequences between the heating and blowing cycles and vice-versa.

Among others, gas fed to the regenerative heater during the heating phase is generally oxidizing and therefore liable to react explosively with high calorific process gas supplied during the blowing cycle. In order to avoid that any dangerous quantity of oxidizing gas is present in the regenerative heater during the changeover to the blowing phase, PAUL WURTH proposed, in PCT application WO2010/133476, a method of operating the burners in a manner that ensures that any oxygen is consumed in the regenerative heater. For the transition from the blowing phase to the heating phase, WO2010/133476 proposes to push out the residual CO containing process gas out of the regenerative heater with the flue gas of the burner.

However, WO2010/133476 is silent about specific measures related to the changeover from the blowing phase to the heating phase. In view of the fact that pressure in the regenerative heater during the blowing phase (on-blast pressure) is typically higher than pressure during the heating phase (on-gas pressure), it may be necessary to take specific measures before the burner(s) can be ignited.

BRIEF SUMMARY

The invention provides an improved method for operating regenerative heaters, in particular as regards the changeover from the blowing phase to the heating phase.

The method of operating regenerative heaters according to the invention may be used in a blast furnace plant that comprises a blast furnace, a gas separation unit, e.g. a pressure swing adsorption (PSA) device and/or a vacuum pressure swing adsorption device (VPSA), configured for separating top gas from the blast furnace into a CO-enriched stream of so-called process gas (hereinafter also referred to as CO-enriched process gas) and a CO-depleted stream of so-called tail gas (hereinafter also referred to as CO-depleted tail gas), and at least three regenerative heaters, each having internal heat storage elements, a cold blast inlet for receiving process gas from the gas separation unit and a hot blast outlet for feeding process gas to the blast furnace. The regenerative heaters are cyclically operated on blast and on gas:

while a regenerative heater is operated on gas, hot flue gas is produced with a burner and the hot flue gas is caused to flow through the regenerative heater so as to heat the heat storage elements; and while a regenerative heater is operated on blast, process gas is blown through the regenerative heater so that the process gas takes up heat from the heat storage elements.

During a changeover of a regenerative heater from on-blast to on-gas operation, the regenerative heater is purged from process gas using flue gas collected after having flown through at least one of the regenerative heaters.

Preferably, the cyclic operations of the regenerative heaters are dephased amongst each other such that, at any one time, at least one of the regenerative heaters is operated on blast while at least one of the other regenerative heaters is operated on gas. The purging of the regenerative heater undergoing the changeover is then preferably effected with flue gas from the at least one other regenerative heater that is operated on gas at the time of the changeover. The flue gas used to purge may be directly fed from the at least one other regenerative heater that is operated on gas to the regenerative heater undergoing the changeover.

Alternatively or additionally, the purging of the regenerative heater undergoing the changeover is effected with flue gas previously stored in a gas storage, e.g. in a CCS ($CO_2$ capture and storage) unit.

Typically, a regenerative heater operated on blast is at an on-blast pressure (typically in the range of 5 to 7 bar (absolute)), whereas a regenerative heater operated on gas is at an on-gas pressure (typically in the range of 0.9 to 1.3 bar (absolute)) lower than the on-blast pressure. Therefore, preferably, during a changeover of a regenerative heater from on-blast to on-gas operation, residual process gas is released from the regenerative heater undergoing the changeover so as to depressurize it prior to purging with flue gas.

According to a preferred embodiment of the invention, such release of process gas is at least partly effected into a top gas recovery installation provided for leading top gas from the blast furnace to the gas separation unit. The top gas recovery installation may comprise a top gas conduit (e.g. a top gas downcomer), a gas cleaning installation (e.g. with a dry dust-catcher followed by a wet dust-scrubber), arranged downstream of the blast furnace and upstream of the gas separation unit. As top gas pressure upstream the gas separation unit is typically comprised in the range of 3 to 5 bar (absolute), after depressurization into the top gas recovery installation, it may be necessary to further depressurize the regenerative heater. That further depressurization may be effected by releasing process gas into a gas holder provided for storing tail gas. The gas holder is preferably held at a pressure slightly higher than atmospheric pressure (e.g. in the range of 1 to 1.5 bar (absolute), preferably at 1.1 bar).

Instead of depressurizing first into the top gas recovery installation and then into the tail gas holder, the depressurization may, alternatively, be carried out entirely into the tail gas holder. In case of a 4-stoves plant, depressurization may also be effected by relieving the residual process gas into the $4^{th}$ stove.

Preferably, process gas left over in the regenerative heater undergoing the changeover after the depressurization is (forcibly) expelled by the flue gas and burnt off or, (forcibly) expelled by the flue gas into the tail gas holder. Advantageously, in order to avoid that the CO concentration of the gas stored in the tail gas holder drops below a certain level, process gas is conveyed into the gas holder at most as long as CO concentration in the expelled process gas (which is increasingly contaminated with the flue gas) amounts to a predetermined percentage (which has to be determined based upon the relevant plant parameter) of CO concentration in the tail gas. Preferably, any expelled process gas not conveyed to the gas holder is burnt off.

An aspect of the present invention concerns a blast furnace plant that is configured and arranged for carrying out the method.

BRIEF DESCRIPTION OF THE DRAWINGS

Further details and advantages of the present invention will be apparent from the following detailed description a limiting embodiment with reference to the attached drawing, wherein.

DESCRIPTION OF PREFERRED EMBODIMENTS

Figure 1:
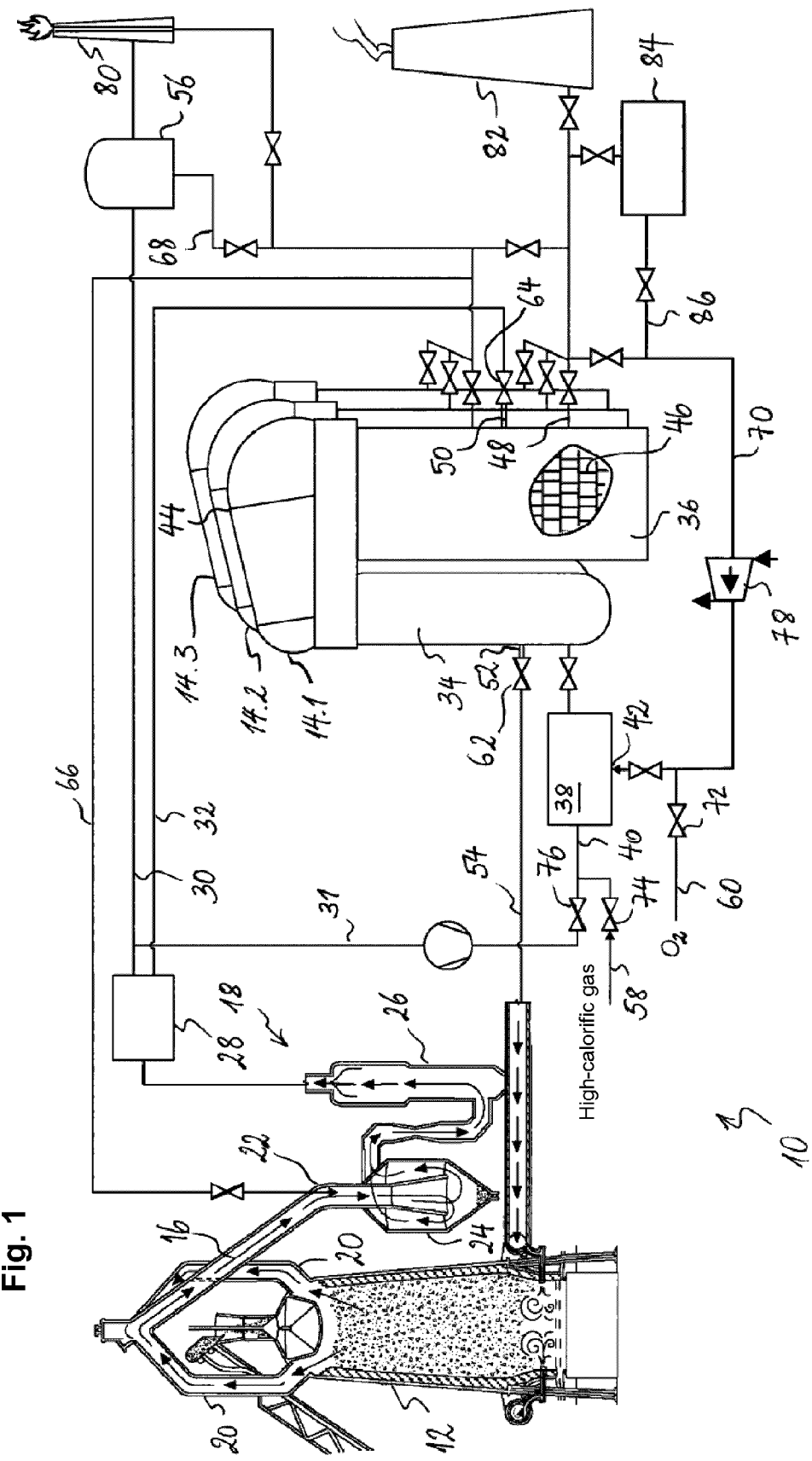
FIG. 1 is a block schematic diagram of a blast furnace plant configured for carrying out the method according to a preferred embodiment of the invention.

FIG. 1 shows block schematic diagram of a blast furnace plant 10 configured for carrying out the method according to a preferred embodiment of the invention.

The blast furnace plant 10 comprises a blast furnace 12 and a plurality of at least three regenerative heaters 14.1, 14.2 and 14.3. The blast furnace plant is furthermore equipped with a top gas recirculation installation that recovers top gas 16 from the top of the blast furnace 12 and feeds part of the recovered top gas through a recycling process before injecting it back into the blast furnace. The top gas recirculation installation includes a top gas recovery installation 18, which collects the top gas 16 at the top of the blast furnace 12 and subjects the top gas to an initial cleaning to remove e.g. dust particles. In the example illustrated in FIG. 1, the top gas recovery installation 18 is comprised of uptakes 20, downcomer 22, a dry dust-catcher 24 and a gas washer 26 (including e.g. a spray washer and an electrical precipitator). Downstream of the gas washer, the cleaned top gas is subjected to $CO_2$ removal in a gas separation unit 28 (e.g. a PSA device). The $CO_2$ removal unit produces two streams of gas: a $CO_2$ rich tail gas 30 (which still contains about 10 to 15% CO by volume) and a CO rich process gas 32. The $CO_2$ rich tail gas 30 may additionally be fed through a cryogenic unit (not shown) to separate pure $CO_2$ out of the $CO_2$ rich tail gas. The pure $CO_2$ may subsequently be pumped into the ground for storage. The CO rich process gas 32 is heated up and fed back into the blast furnace 12 as reducing gas.

The heating of the CO rich process gas is carried out in the regenerative heaters 14.1, 14.2 and 14.3. Each of the regenerative heaters 14.1, 14.2, 14.3 comprises a first chamber 34 ("combustion chamber") and a second chamber 36 ("checker chamber"). The regenerative heaters 14.1, 14.2, 14.3 are cyclically operated on blast (blowing phase) and on gas (heating phase).

During the heating phase, fuel gas and oxidizing gas are fed to the burner 38 via gas inlets 40 and 42, respectively. The fuel and oxidizing gas are ignited and their combustion creates hot flue gasses, which ascend through the first chamber 34 into a dome 44. The dome 44 deviates the hot flue gasses and feeds them into the second chamber 36 comprising heat storage elements, generally in the form of checker bricks 46. The heat storage elements define a multiplicity of small passageways through which the hot flue gasses pass downwardly to exit the regenerative heater 14.1, 14.2 or 14.3 through a flue gas outlet 48 in the lower portion of the second chamber 36. Flue gas may finally be disposed of via a chimney 82. More preferably, however, flue gas is dried and stored in an underground $CO_2$ storage 84.

During the subsequent blowing phase, process gas 32 is blown into the second chamber 36 through the cold blast inlet 50 in the lower portion of the second chamber 36. As the process gas passes through the passageways between the heat storage elements, heat is transferred from the checker bricks 46 to the process gas. At the top of the second chamber 36, the hot process gas is fed, via the dome 44, into the first chamber 34. The hot process gas flows downwardly through the first chamber and then exits the regenerative heater 14.1, 14.2 or 14.3 through the hot blast outlet 52, which is connected to the hot blast line 54. The hot blast line 54 feeds the hot process gas into the blast furnace 12.

The gas separation unit 28 is connected to a tail gas network that comprises, in particular a tail gas holder 56. A part of the tail gas 30 is used to fuel the burners 38 of the regenerative heaters 14.1, 14.2 and 14.3. To this end, the (low-calorific) tail gas is led via the conduit 31 and mixed with high-calorific gas 58 (e.g. coke oven gas). The mixture is then fed to the burner 38, where it serves as the combustible. The burner 38 could be fed with air to burn the mixture of tail gas and high-calorific gas. FIG. 1 shows a more preferred solution, according to which flue gas from the regenerative heaters 14.1, 14.2, 14.3 is mixed with pure oxygen 60 to form an oxidizing gas. The oxidizing gas preferably has a composition of about 80% of $CO_2$ (and residual nitrogen) by volume and about 20% of $O_2$ by volume. The advantage of such oxidizing gas mixture is that one can use a burner that works also with air. It should be noted that the mixture of combustible gas could also be burnt in pure oxygen, provided that appropriate burners are used.

The cyclic operations of the regenerative heaters 14.1, 14.2, 14.3 are dephased amongst each other such that, at any time during the normal operation of the blast furnace plant 10, one of the regenerative heaters 14.1, 14.2, 14.3 is operated on blast while the two others are operated on gas. The transitions between heating and blowing and vice-versa are synchronized, in such a way that when the regenerative heater on blast changes over to on-gas operation, one of the regenerative heaters on gas takes over the blowing.

In the changeover of a regenerative heater (in the following explanation it will be assumed that this is regenerative heater 14.1) from blowing to heating operation, first, the hot blast valve 62 and the cold blast valve 64 are closed. At that time, the residual process gas inside the regenerative heater 14.1 is still at the on-blast pressure of about 6 bar (absolute). Depressurization of the regenerative heater undergoing the changeover may be then carried out in one or in two steps. In case of a one-step depressurization, process gas is released gas from the regenerative heater 14.1 into the tail gas network, in particular into the tail gas holder 56, via conduit 68, or, in case of a 4-stove plant, into the fourth hot blast stove (not shown). In case of a two-step depressurization, a first depressurization is achieved by releasing process gas from the regenerative heater 14.1 into the top gas recovery installation 18, via the depressurization conduit 66. Gas pressure in the top gas recovery installation 18 is typically comprised in the range from 3 to 5 bar (absolute), e.g. 4.5 bar (absolute). After equalization of pressures, the depressurization conduit 66 is closed. A second depressurization is then achieved into the tail gas network, in particular into the tail gas holder 56, via conduit 68. Gas pressure in the tail gas network is typically about 1.1 bar (absolute), so that the regenerative heater may be depressurized to that pressure during the second depressurization step. After equalization of pressures, the regenerative heater is still full of process gas.

The regenerative heater 14.1 undergoing the changeover is then purged using flue gas from the regenerative heater that is operated on gas at the time of the changeover (it will be assumed, for sake of the explanation that this is regenerative heater 14.3). The flue gas is fed from the flue gas outlet of the regenerative heater 14.3 to the flue gas recirculation conduit 70 of the regenerative heater 14.1. At that time, the oxygen supply valve 72, the high-calorific gas supply valve 74 and the tail gas supply valve 76 are closed, and the burner 38 is off. A pump or a compressor 78 creates the necessary pressure difference to introduce the flue gas into the regenerative heater 14.1. As flue gas is led into the regenerative heater 14.1, residual process gas is expelled into the tail gas network, via the conduit 68. The more process gas is expelled, the more it will be contaminated with injected flue gas. At some point, it will no longer be possible to lead the expelled process gas (which is in fact a mixture of process gas and flue gas) into the tail gas network because the quality of the tail gas would be too much deteriorated. Preferably, the conduit 68 is closed when the CO concentration in the expelled process gas has diminished to a certain percentage by volume of the nominal CO concentration in the tail gas network. If the purging still has to be continued, the mixture of process gas and flue gas may be fed to a flare 80 or into a gas separation unit (not shown) that removes any residual amount of CO. Purging is stopped when the concentration of CO in the regenerative burner 14.1 has come down to a value that is safe for starting the burner 38.

If it should not be possible, due to exceptional circumstances, to collect (enough) flue gas for purging a regenerative heater at the flue gas outlet of one of the other regenerative heaters, flue gas previously stored in the $CO_2$ storage 84 may be used. To this end, conduit 86 is opened.

As concerns the changeover from the heating to the blowing phase, care has to be taken that there is no or only an uncritical amount of oxidizing gas in the regenerative heater when the cold blast valve 64 is opened and CO rich process gas enters the second chamber. The CO rich process gas and the oxidizing gas could otherwise form a dangerous mixture that could ignite and damage the regenerative heater. In order to ensure that no oxidizing gas is present at the beginning of the blowing phase, at the end of the heating phase, different measures can be taken. According to a first option, first oxygen supply is stopped by closing the oxygen supply valve 72. Consequently, no more oxygen is fed into the system. In order to consume any residual oxygen, fuel gas mixture continues to be fed to the burner 38. When all the oxidizing gas is gone, the combustion stops by itself. The supplies of the fuel gas mixture and flue gas are now interrupted. The blowing phase can begin safely by opening the cold blast valve 64, whereby the regenerative heater is brought to the on-blast pressure, and then the hot blast valve 62. During a short time at the beginning of each blowing phase, flue gas will be fed to the blast furnace 12. Nevertheless, the amount of flue gas is not sufficient to disturb the operation of the blast furnace. According to a second option for avoiding that oxidizing gas is present in the regenerative heater at the beginning of the blowing phase, the combustion is stopped in the conventional way (i.e. by stopping arrival of the fuel gas mixture first), which leads to residual oxygen in the regenerative heater. This oxygen is then removed from the regenerative heater by an additional purging phase with waste gas from another regenerative heater.

While a specific embodiment has been described in detail, those skilled in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

It is worthwhile noting, in particular, that the burners of the regenerative heaters could be fed with a different fuel gas or a different mixture of fuel gas. A mixture of tail gas and coke oven gas, as discussed in the example, is, however, a preferred option, since both types of gas are typically available in a blast furnace plant operating with top gas recycling. As concerns the oxidizing gas, which in the example is a mixture of oxygen and recirculated flue gas, an alternative solution would be to burn part of the tail gas with an excess of oxygen in a pre-combustion chamber, so as to achieve the desired mixture of inert gas (burnt tail gas, essentially $CO_2$) and oxygen.

The invention claimed is:

1. A method of operating regenerative heaters, in particular hot-blast stoves, in a blast furnace plant, said plant comprising:

a blast furnace, a gas separation unit configured for separating top gas from said blast furnace into a stream of CO-enriched process gas and a stream of CO-depleted tail gas;

at least three regenerative heaters, each having internal heat storage elements, a cold blast inlet for receiving CO-enriched process gas from said gas separation unit and a hot blast outlet for feeding CO-enriched process gas to said blast furnace;

said method comprising
cyclically operating said regenerative heaters on blast and on gas, said cyclic operation including
while operating a regenerative heater on gas, producing hot flue gas with a burner and causing said hot flue gas to flow through said regenerative heater so as to heat said heat storage elements; and
while operating a regenerative heater on blast, blowing CO-enriched process gas through said regenerative heater for the CO-enriched process gas to take up heat from said heat storage elements;
said method further comprising
during a changeover of a regenerative heater from on-blast to on-gas operation, purging said regenerative heater from CO-enriched process gas with flue gas collected after having passed through at least one of said regenerative heaters.

2. Method as claimed in claim 1, wherein said cyclic operations of said regenerative heaters are dephased amongst each other such that, at a time, at least one of said regenerative heaters is operated on blast while at least one of the others of said regenerative heaters is operated on gas, and wherein said purging of said regenerative heater undergoing said changeover is effected with flue gas from another one of said regenerative heaters that is operated on gas at the time of said changeover.

3. Method as claimed in claim 1, wherein said purging of said regenerative heater undergoing said changeover is effected with flue gas previously stored in a gas storage.

4. Method as claimed in claim 1, wherein a regenerative heater operated on blast is at an on-blast pressure, wherein a regenerative heater operated on gas is at an on-gas pressure lower than said on-blast pressure, and wherein, during a changeover of a regenerative heater from on-blast to on-gas operation, CO-enriched process gas is released from said regenerative heater undergoing said changeover so as to depressurize it prior to purging with flue gas.

5. Method as claimed in claim 4, wherein said release of CO-enriched process gas is at least partly effected into a top gas recovery installation provided for leading top gas from said blast furnace to said gas separation unit.

6. Method as claimed in claim 4, wherein said release of CO-enriched process gas is at least partly effected into a gas holder provided for storing CO-depleted tail gas.

7. Method as claimed in claim 4, wherein CO-enriched process gas left over in said regenerative heater undergoing said changeover after said depressurization is expelled by said flue gas and burnt off.

8. Method as claimed in claim 6, wherein CO-enriched process gas left over in said regenerative heater undergoing said changeover after said depressurization is expelled by said flue gas into said gas holder.

9. Method as claimed in claim 6, wherein CO-enriched process gas is conveyed into said gas holder at most as long as CO concentration in said expelled CO-enriched process gas amounts to a predetermined percentage of CO concentration in said CO-depleted tail gas.

10. Method as claimed in claim 9, wherein any expelled CO-enriched process gas not conveyed to said gas holder is burnt off.

11. A blast furnace plant comprising:
a blast furnace,
a gas separation unit configured for separating top gas from said blast furnace into a stream of CO-enriched process gas and a stream of CO-depleted tail gas;
at least three regenerative heaters, each having internal heat storage elements, a cold blast inlet for receiving CO-enriched process gas from said gas separation unit and a hot blast outlet for feeding CO-enriched process gas to said blast furnace;
wherein the blast furnace plant is structured to carry out a method comprising:
cyclically operating said regenerative heaters on blast and on gas, said cyclic operation including
while operating a regenerative heater on gas, producing hot flue gas with a burner and causing said hot flue gas to flow through said regenerative heater so as to heat said heat storage elements; and
while operating a regenerative heater on blast, blowing CO-enriched process gas through said regenerative heater for the CO-enriched process gas to take up heat from said heat storage elements; and
wherein the blast furnace plant is further structured to carry out the step of
purging said regenerative heater from CO-enriched process gas with flue gas collected after having passed through at least one of said regenerative heaters during a changeover of a regenerative heater from on-blast to on-gas operation.

* * * * *